United States Patent Office.

JOHN STEVENS, OF NEW YORK, N. Y., AND JOHN JOHNSON, OF SACO, MAINE.

*Letters Patent No. 62,377, dated February 26, 1867.*

---

IMPROVEMENT IN PREPARING MICA FOR TABLETS AND OTHER PURPOSES.

---

The Schedule referred to in these Letters Patent and making part of the same.

---

TO ALL WHOM IT MAY CONCERN:

Be it known that we, JOHN STEVENS, of the city, county, and State of New York, and JOHN JOHNSON, of the town of Saco, county of York, State of Maine, have invented New Uses for Mica and Treating the Same; and we do hereby declare that the following is a full description thereof.

The nature of our invention consists in the application and use of mica for permanent records, and in making mica translucent, at the same time rough enough to abrade a pencil when using such mica as a slate or tablet.

In preparing the mica, we select such as is fit, being of even texture, smooth and level, and then roughen the surfaces with emery, sand, or other suitable substance, or coat over the surfaces with any suitable preparation to render the mica thus prepared a tablet. The sheets thus treated we frame or bind in any suitable manner. As a substitute for a frame, we find that by varnishing the edges we effectually seal the laminæ and render the mica tablets portable, and convenient for placing within a book. To render the tracings or markings more visible, it is desirable that some of the frames be made so that a very white surface be placed beneath or between the laminæ. Sheets of mica properly prepared may be combined together to form a pocket tablet or memorandum book. When preparing the mica for permanent records, such as deeds, wills, or other important documents for record, we select such sheets as are suitable for the purpose and properly prepare the edges to prevent the splitting up of the laminæ, or frame them, or bind them, as may be best for the kind of record to be permanently engraved thereon.

Mica sheets when thus prepared can readily be written upon with a stylus, and form a record less perishable by the elements than any other substance we are acquainted with.

What we claim, is—

The use of mica for the purposes herein specified, viz, for tablets, books, and for records.

JOHN STEVENS, [L. S.]
JOHN JOHNSON. [L. S.]

Witnesses:
R. CARLTON OVERTON,
EDWIN A. OVERTON.